(12) United States Patent
Hall

(10) Patent No.: US 6,434,632 B1
(45) Date of Patent: Aug. 13, 2002

(54) METHOD AND APPARATUS FOR THE AUTOMATIC CONFIGURATION OF STRAPPING OPTIONS ON A CIRCUIT BOARD ASSEMBLY

(75) Inventor: Jerald N. Hall, Scappoose, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/439,945

(22) Filed: Nov. 12, 1999

Related U.S. Application Data

(63) Continuation of application No. 08/778,308, filed on Jan. 2, 1997, now Pat. No. 6,101,319.

(51) Int. Cl.[7] .............................................. G06F 13/14
(52) U.S. Cl. ............................. 710/14; 710/31; 712/43; 713/1
(58) Field of Search ................................ 710/8, 14, 10, 710/31; 712/43; 713/1

(56) References Cited

U.S. PATENT DOCUMENTS

| | | | |
|---|---|---|---|
| 4,268,901 A | 5/1981 | Subrizi et al. ............ 340/172.5 |
| 4,377,861 A | 3/1983 | Huffman ..................... 370/112 |
| 4,388,672 A | 6/1983 | Skill ............................ 361/412 |
| 4,773,005 A | 9/1988 | Sullivan ...................... 364/200 |
| 4,775,931 A | 10/1988 | Dickie et al. ................ 364/200 |
| 4,821,179 A | 4/1989 | Jensen et al. ................ 364/200 |
| 4,853,844 A | 8/1989 | Kono ........................... 364/200 |
| 4,980,850 A | * 12/1990 | Morgan ....................... 364/900 |
| 5,077,738 A | 12/1991 | Larsen et al. .............. 371/15.1 |
| 5,220,673 A | 6/1993 | Dalrymple et al. .......... 395/775 |
| 5,243,700 A | 9/1993 | Larsen et al. ............... 395/275 |
| 5,455,923 A | 10/1995 | Kaplinsky .................... 395/481 |
| 5,530,895 A | 6/1996 | Enstrom ....................... 395/829 |
| 5,724,527 A | 3/1998 | Karnik et al. ................ 395/308 |
| 5,737,235 A | * 4/1998 | Kean et al. ................... 364/490 |
| 5,968,140 A | * 10/1999 | Hall .............................. 710/14 |
| 6,101,319 A | * 8/2000 | Hall ........................... 395/183.18 |
| 6,145,072 A | * 11/2000 | Shams et al. .................. 712/22 |

* cited by examiner

Primary Examiner—Jeffrey Gaffin
Assistant Examiner—Abdelmoniem Elamin
(74) Attorney, Agent, or Firm—Blakely, Sokoloff, Taylor & Zafman LLP

(57) ABSTRACT

A tenant processor module is shown comprising a processor core, a plurality of strapping devices, and an input bus. The plurality of strapping devices are configured to indicate configuration information to a receiving circuit board assembly coupled to the processor module. The input bus, coupled to the processor core, receives the configuration information back from the circuit board assembly and provides them to the processor core at a first time. At a second time, the input bus receives operational data from the circuit board assembly and provides them to the processor core.

21 Claims, 4 Drawing Sheets

METHOD AND APPARATUS FOR THE AUTOMATIC CONFIGURATION OF STRAPPING OPTIONS ON A CIRCUIT BOARD ASSEMBLY

This application is a continuation of application Ser. No. 08/778,08 filed Jan. 2, 1997 now U.S. Pat. No. 6,101,319, and titled "METHOD AND APPARATUS FOR THE AUTOMATIC CONFIGURATION OF STRAPPING OPTIONS ON A CIRCUIT BOARD ASSEMBLY.

BACKGROUND OF THE INVENTION

1. Field of the Invention

The present invention relates to the field of computer systems and, in particular, to a method and apparatus for the automatic configuration of strapping options on a circuit board assembly.

2. Background Information

Recognizing that "one size does not fit all" in the computer industry, many computer system manufacturers offer a wide variety of computer systems to satisfy a variety of markets and budgets. While such variety makes personal computers available to a wider spectrum of consumers, the same product variety adds complexity to the manufacturing process which, when left unaddressed, may well result in quality and efficiency problems.

In an effort to improve efficiency and alleviate quality problems associated with the circuit board assembly process, many manufacturers have determined that it is more cost effective to settle on a few circuit board assembly "platforms". These platforms are essentially the same, or very similar, circuit board assemblies populated with similar components, wherein the operating characteristics of the circuit board assembly are determined by manually setting strapping devices to configure the configurable devices of the circuit board assembly. This manual setting of the strapping devices selectively configures a circuit board assembly "platform" into a particular genre of circuit board assembly (i.e., a circuit board assembly suitable for a particular use/product). In other words, the selective configuration of strapping devices provide an otherwise generic circuit board assembly with the "personality" characteristics (i.e., operating characteristics) commonly associated with a specific product. On, for example, computer system motherboards, strapping devices are often used to configure a clock source to supply a particular system bus clock frequency, or to indicate bus/core ratio (i.e., a the ratio of the bus clock frequency to the processor clock frequency) configuration information. Jumper blocks, dual-inline package (DIP) switches, double-pole single-throw (DPST) switches are but a few examples of strapping devices which are configured to select the operating configuration on a circuit board assembly.

Although the concept of the selective configuration of a generic circuit board assembly with strapping devices has indeed improved some of the efficiency problems, they have not eliminated the quality concerns and, in fact, have introduced new quality issues. For example, many of the prior art strapping devices are manually placed on the circuit board assembly in the manufacturing process, which is prone to human error. The misconfiguration of a circuit board assembly (i.e., the configuration of a strapping device which is inconsistent with the operating characteristics of a processor module) may well result in diminished performance or catastrophic failure for the consumer.

In addition to the quality and efficiency problems associated with prior art strapping devices, they do not lend themselves well to the upgrade of the circuit board assembly. For example, upgrading the central processing unit (CPU) to a higher performance processor may require that the strapping devices associated with the clock frequency and bus/core ratio be updated to take advantage of the performance characteristics of the higher performance processor. With many of the common prior art strapping devices, the reconfiguration of strapping options is performed by hand by a service technician. Just as in the manufacturing process, the manual reconfiguration of strapping devices in this manner is prone to human error and mechanical failure.

Thus a need exists for a method and apparatus for the automatic configuration of strapping options of a circuit board assembly, unencumbered by the deficiencies and limitations associated with the prior art.

SUMMARY OF THE INVENTION

In accordance with the teachings of the present invention, a method and apparatus for the automatic configuration of strapping options on a circuit board assembly is disclosed. In a first embodiment, a tenant processor module is shown comprising a processor core, a plurality of strapping devices, and an input bus. The plurality of strapping devices are configured to indicate configuration information to a receiving circuit board assembly coupled to the processor module. The input bus, coupled to the processor core, receives the configuration information back from the circuit board assembly and provides them to the processor core at a first time. At a second time, the input bus receives operational data from the circuit board assembly and provides them to the processor core.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
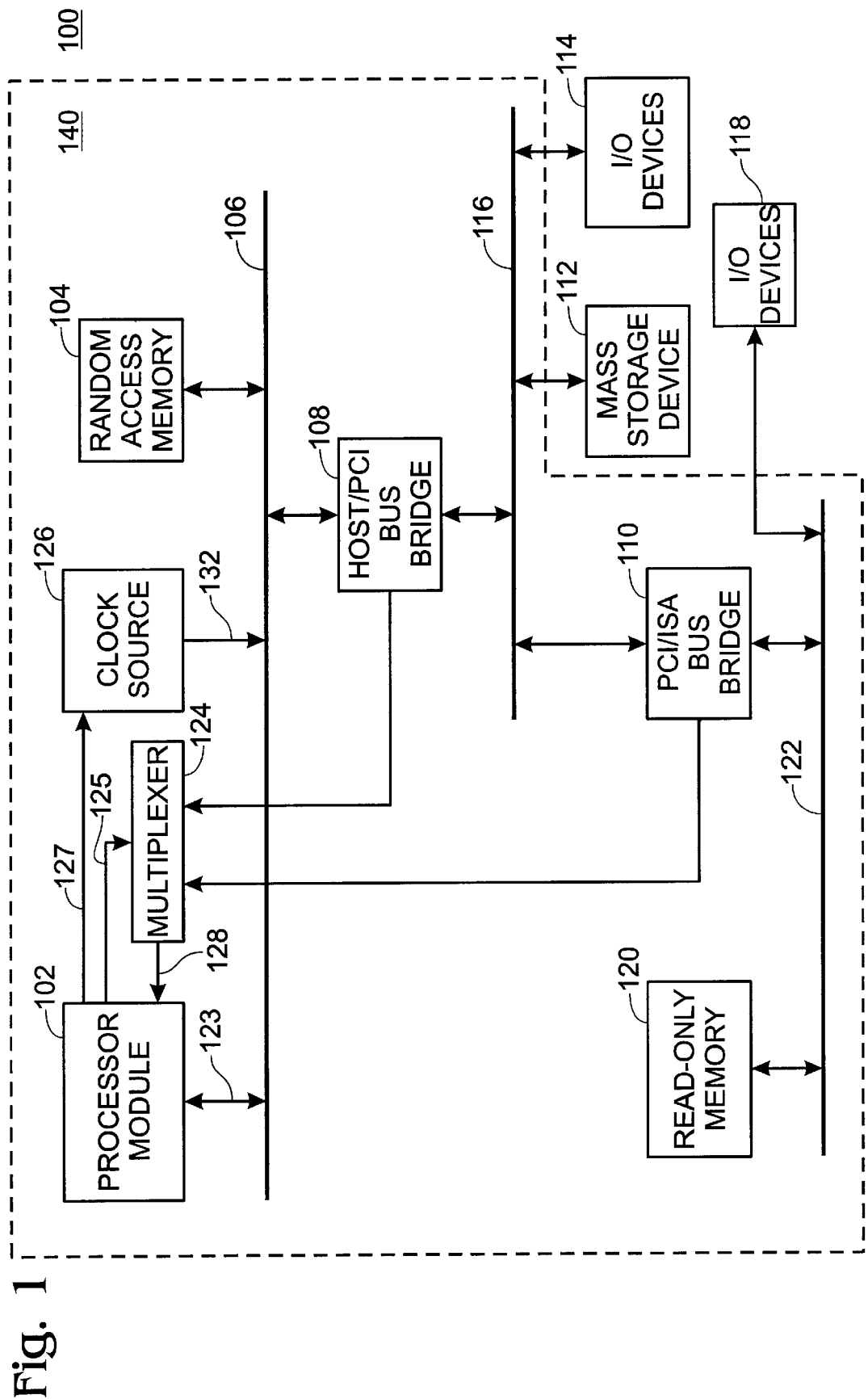
FIG. 1 is a block diagram illustrating an exemplary computer system including a processor module incorporated with the teachings of the present invention.

Referring now to FIG. 1, a block diagram of an exemplary computer system including a processor module incorporated with the teachings of the present invention, is illustrated. In accordance with the teachings of the present invention, tenant processor module 102 is selectively configured to indicate configuration information to receiving circuit board assembly 140, and to receive, at a first time, the indicated configuration information back from circuit board assembly 140 to configure processor module 102. As illustrated in FIG. 1, exemplary computer system 100 is shown comprising circuit board assembly 140 with random access memory 104, multiplexer 124, clock source 126 and processor module 102 incorporated with the teachings of the present invention, each of which is coupled to host bus 106 as depicted. As will be described further with reference to FIGS. 2–4, processor module 102 configures configurable devices resident on circuit board assembly 140 including processor module 102 itself, during power-up and reset states, in accordance with the operating characteristics of processor module 102.

With continued reference to FIG. 1, bridge 108 is also coupled to host bus 106 for coupling host bus 106 to one or more, typically input/output (I/O), buses. In one embodiment, bus 116 is a Peripheral Component Interconnect (PCI) bus. As depicted, Host/PCI bus bridge 108 couples host bus 106 to PCI bus 116. In addition to coupling host bus 106 with PCI bus 116, Host/PCI bus bridge 108 is also coupled to multiplexer 124. A mass storage device 112 such as a magnetic or optical disk is coupled with PCI bus 116 for storing information and instruction for processor module 102. I/O devices 114 are also coupled to PCI bus 116, which input and output data and control information to and from processor module 102. I/O devices 114 may include, for example, a display device, and alphanumeric input device including alphanumeric and function keys, and a cursor control device. A hard copy device such as a plotter or printer may also be included in the devices cumulatively referred to as I/O devices 114 for providing a visual representation of computer images, or a network adapter device may be included in the I/O devices 114 for coupling exemplary computer system 100 to a computer network, such as a Local Area Network (LAN) (not shown).

In one embodiment, PCI bus 116 is also coupled to an Industry Standard Architecture (ISA) bus 122 via PCI/ISA bus bridge 110. In addition to bridging PCI bus 116 to ISA bus 122, PCI/ISA bus bridge 110 is also coupled to multiplexer 124, as shown. A read-only memory (ROM) 120 is coupled to ISA bus 122 for storing static information and instructions for processor module 102. I/O devices 118 may also be coupled to ISA bus 122 which input and output data and control information to and from processor module 102. These I/O devices 118 may include some of the same devices as illustrated in I/O devices 114 discussed above. As illustrated in FIG. 1, with the possible exception of some I/O devices 114 and 118, elements 102–126 are disposed on circuit board assembly 140. Thus, in accordance with the teachings of the present invention, processor module 102 is configured to automatically indicate configuration information to configurable devices resident on circuit board assembly 140 configuring circuit board assembly 140 to receive and beneficially function with processor module 102, the detail of which will be described in further detail with reference to FIGS. 2, 3 and 4.

As will be appreciated by those skilled in the art, except for the automatic configuration of circuit board assembly 140 and processor module 102 by processor module 102, elements 102 through 132 perform their conventional functions known in the art. In addition, except for I/O devices 114 and 118, and mass storage device 112, elements 102–132 are disposed on circuit board assembly 140. Accordingly, exemplary computer system 100 is intended to represent a broad category of computing devices.

Figure 2:
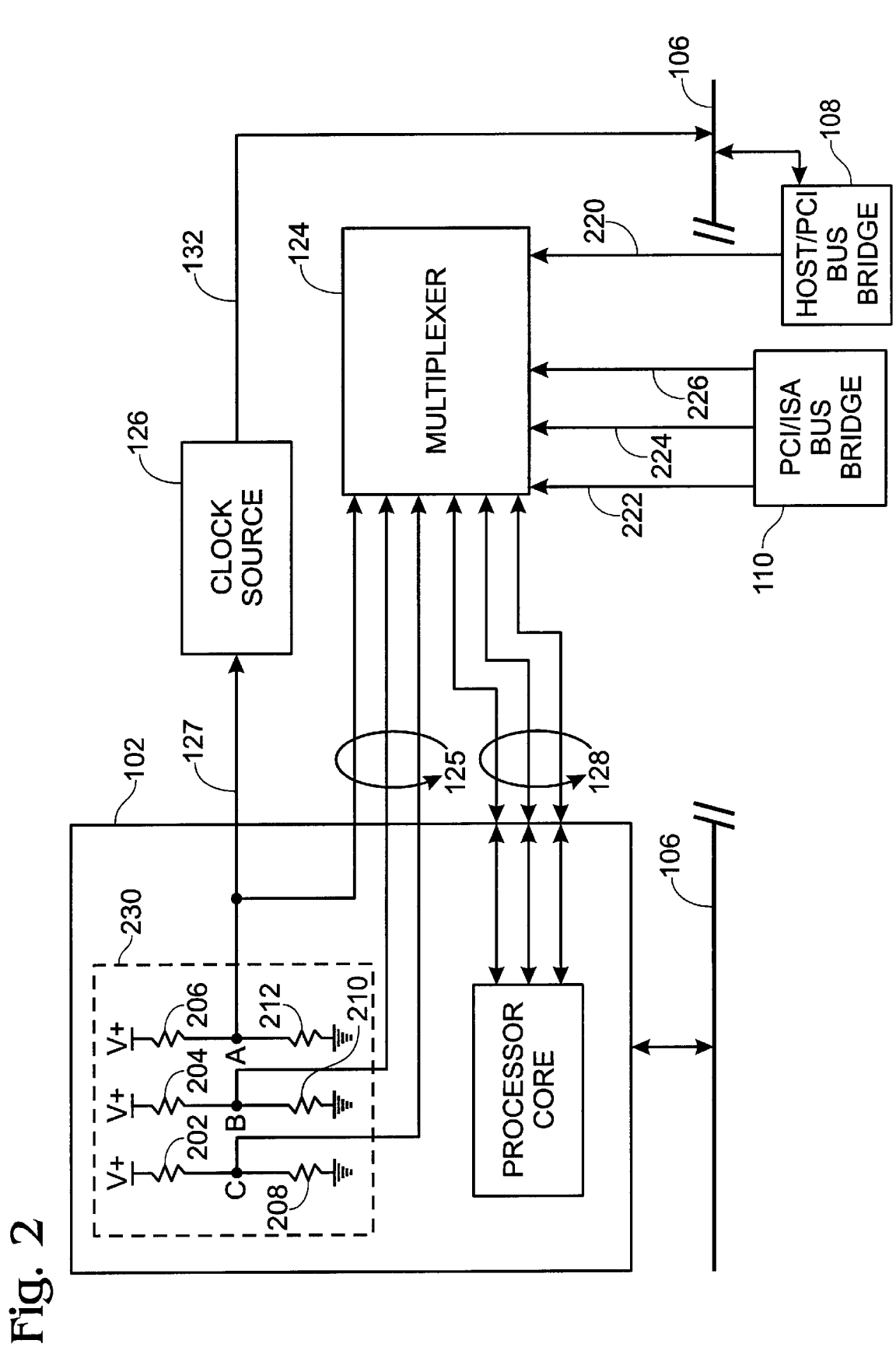
FIG. 2 is a block diagram illustrating the cooperation of an exemplary processor module, incorporated with the teachings of the present invention, with associated elements of the exemplary computer system of FIG. 1.

Turning now to FIG. 2, a block diagram is shown illustrating the cooperation between processor module 102, incorporated with the teachings of the present invention, and other elements of exemplary computer system 100. In particular, FIG. 2 illustrates the cooperation between processor module 102, clock source 126, multiplexer 124, host bus 106, PCI/ISA bus bridge 110 and Host/PCI bus bridge 108. As depicted, processor module 102 is shown including strapping device 230 comprised of pull-up and pull/down resistors 202–212 which are configured to reflect operating characteristics associated with processor module 102. In one embodiment of the present invention, pull-up/pull-down resistors 202–212 are selectively configured to indicate system bus clock frequency and bus/core ratio configuration information. In accordance with this embodiment of the present invention, pull-up/pull-down resistors 202–212 are coupled to clock source 126 via signal line 127, and to multiplexer 124 via configuration output 125, as shown.

Depending on the particular performance characteristics associated with processor module 102, a combination of pull-up resistors 202, 204 and 206, and pull-down resistors 208, 210 and 212 are selectively placed on processor module 102 during the manufacturing process. Accordingly, clock source 126 is configured by processor module 102 to reflect the performance operating characteristics associated with processor module 102, through the selective placement of either pull-up resistor 206, or pull-down resistor 212. For example, if processor module 102 is designed to perform with a system bus clock frequency of 100 MHz, pull-up resistor 206 is placed on processor module 102, while pull-down, resistor 212 is not be placed. In accordance with this example, the selective placement of pull-up resistor 206 results in a logic "1" being asserted on line 127 configuring clock source 126 to generate a 100 MHz system bus clock frequency, which is asserted on host bus 106 via signal line 132. If, however, processor module 102 is designed to operate with a system bus clock frequency of 66 MHz, pull-down resistor 212 is placed, while pull-up resistor 206 is left off of processor module 102, the result of such a configuration is a logic "0" being asserted on line 127 configuring clock source 126 to generate a 66 MHz system bus clock frequency, which is asserted on host bus 106 via signal line 132.

The bus/core ratio for processor module 102 is similarly configured via strapping device 230. In particular, the pull-up resistors 202–206 and pull-down resistors 208–212 of strapping device 230 are selectively placed to indicate a bus/core ratio corresponding to the operating characteristics of processor module 102. Depending upon whether pull-up or pull-down resistors are populated, a logic "1" (i.e., corresponding to the placement of pull-up resistors 202–206) or a logic "0" (i.e., corresponding to the placement of pull-down resistors 208–212) is asserted by processor module 102 on configuration output 125. One example of bus/core ratio selections are depicted below in Table 1.

TABLE 1

Truth Table of Bus/Core Ratio Selection

| C | B | A | Bus/Core Ratio Multiplier |
|---|---|---|---|
| 0 | 0 | 0 | 2 |
| 0 | 0 | 1 | 4 |
| 0 | 1 | 0 | 3 |
| 0 | 1 | 1 | Reserved |
| 1 | 0 | 0 | Reserved |
| 1 | 0 | 1 | Reserved |
| 1 | 1 | 0 | 7/2 |
| 1 | 1 | 1 | Reserved |

In particular, Table 1 depicts a truth table for the selection of a bus/core ratio multiplier based on the logic level asserted at points C, B and A of FIG. 2. As shown, the bus/core radio is selectively configured with the selective placement of pull-up resistors 202–206 or pull-down resistors 208–212. For example, placing pull-down resistors 208 and 210 with pull-down resistors 206, results in logic levels of: "0 0 1" being asserted at points C, B and A, respectively, which is interpreted by processor module 102 as a bus/core ratio multiplier of "4". In addition, it should be noted that although in this example pull-up resistor 206 and pull-down resistor 212 are used to set both the clock frequency as well as set the logic value for node A for the bus/core ratio, one skilled in the art will appreciate these parameters could easily be seperated with the addition of an extra pull-up/pull-down resistor combination to strapping device 230 for clock frequency selection.

In one embodiment of the present invention, processor module 102 requires the input of bus/core ratio configuration information on signal bus 128 only during a power-up or a reset state of processor module 102, while at other times (i.e., normal operational states) signal bus (or, input bus) 128 is used to carry operational information to/from processor module 102. Therefore, although strapping device 230 is configured to continually assert bus/core ratio configuration information on configuration output 125, multiplexer 124 selectively provides the bus/core ratio configuration information to processor module 102 only during a power-up or reset state during which mux__control line 220 is asserted.

In particular, multiplexer 124 receives data from PCI/ISA bus bridge 110 via data lines 222, 224 and 226. The mux__signal is received via mux__line 220 from Host/PCI bus bridge 108. The mux__signal selects the output state of multiplexer 124, selectively asserting either the input received from processor module 102 via configuration output 125, or operational data received from data lines 222–226 Thus, during power-up and reset states of processor module 102, mux__control line 220 is asserted (i.e., a logic "1") by Host/PCI bus bridge 108 which configures multiplexer 124 to couple configuration output 125 of processor module 102 to signal bus 128, thereby supplying the requisite bus/core ratio configuration information to processor module 102. During normal operational states, having completed the power-up/reset state, mux__line 220 is de-asserted (i.e., logic "0") and multiplexer 124 couples data lines 222–226 to signal bus 128. Thus, in accordance with the teachings associated with this embodiment of the present invention, processor module 102 configures configurable devices on circuit board assembly 140, at appropriate times, with configuration information corresponding to operating characteristics of processor module 102.

Figure 3:
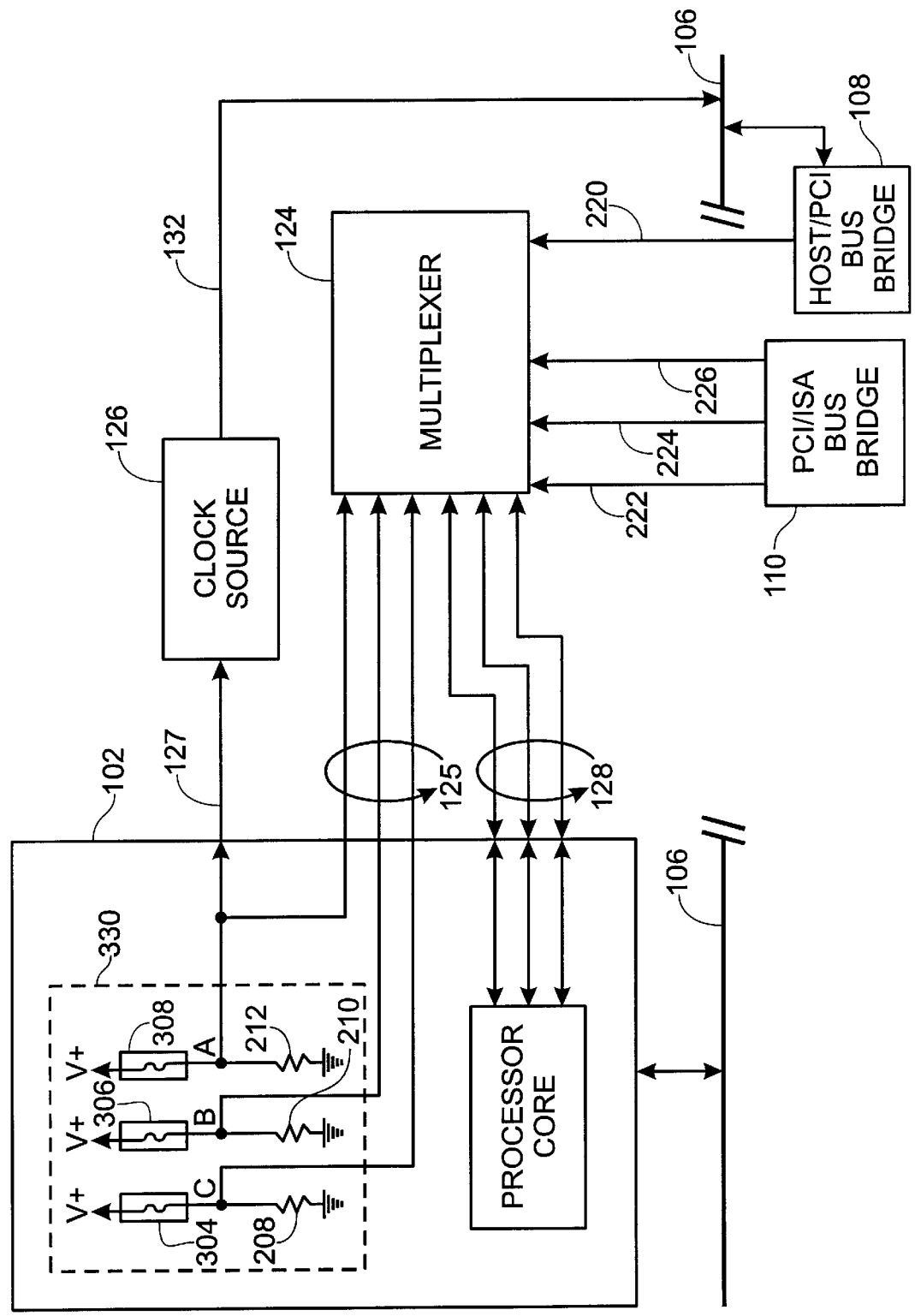
FIG. 3 is a block diagram illustrating an alternate embodiment of the processor module, incorporated with the teachings of the present invention, in cooperation with associated elements of the exemplary computer system of FIG. 1.

Turning to FIG. 3, a block diagram illustrating the cooperation between an alternate embodiment of processor module 102 incorporating the teachings of the present invention, and other elements of exemplary computer system 100 is shown. Of particular interest is strapping device 330, which, in accordance with an alternate embodiment of the present invention, incorporates the use of fuses 304, 306 and 308 as a means of selectively indicating configuration information to circuit board assembly 140, corresponding to certain performance characteristics of processor module 102. That is, in one embodiment of the present invention, strapping device 330 is comprised of a plurality of fuses 304, 306 and 308 placed in series with pull-down resistors 208–212 between a positive voltage source ("V+") and ground, as depicted. In accordance with this embodiment of the present invention, the configuration information is determined by selectively "blowing" (i.e., momentarily setting V+ to exceed the power rating of) fuses 304–308.

In particular, depending on certain performance characteristics associated with processor module 102, fuses 304, 306 and 308 are selectively blown during the manufacturing process by overdriving V+ coupled to the selected fuse. In other words, selected fuses are eliminated by momentarily driving V+ to a power level which exceeds their power rating. In one embodiment, by selectively eliminating fuses 304–308, clock source 126, resident on circuit board assembly 140, and the bus/core ratio multiplier (see, for example, Table 1) is configured by processor module 102 to reflect the performance operating characteristics associated with processor module 102. For example, if processor module 102 is designed to perform with a system bus clock frequency of 100 MHz, fuse 308 is retained, maintaining the conductive path to "V+", which results in a logic "1" being asserted on line 127. In accordance with this example, with line 127 asserted, clock source 126 generates a 100 MHz system bus clock frequency, asserted on host bus 106 (otherwise referred to as a system bus) via signal line 132. If, however, processor module 102 is designed to perform with a system bus clock frequency of 66 MHz, power source V+ is driven to exceed the power rating of fuse 308 which eliminates the conductive path to V+, while pull-down resistor 212 is retained thereby asserting a logic "0" on line 127. Accordingly, clock source 126 generates a 66 MHz system bus clock frequency asserted on host bus 106 via signal line 132.

With continued reference to FIG. 3, the bus/core ratio for processor module 102 is similarly configured via strapping device 330. In particular, fuses 304–308 are selectively blown to indicate a bus/core ratio corresponding to the operating characteristics of processor module 102. Depending upon whether fuses 304–308 remain, a logic "1" or a logic "0" is asserted by processor module 102 on configuration output 125 to multiplexer 124. In one embodiment of the present invention, the bus/core ratio is selected in accordance with the truth table of Table 1. As described above with reference to FIG. 2, depending upon the state of mux__control line 220, multiplexer 124 may assert bus/core ratio configuration information on signal bus 128 (i.e., during a power-up or reset state), or alternatively, may assert operational data received via data lines 222–226 on signal bus 128 (i.e., during normal operational states). In one embodiment of the present invention, an extra set of fuse/pull-down resistors (not shown) are added to strapping device 330 to separate the selection of the clock frequency from the selection of the bus/core ratio. Thus, in accordance with the teachings associated with this embodiment of the present invention, processor module 102 configures configurable devices on circuit board assembly 140, at appropriate times, with configuration information corresponding to operating characteristics of processor module 102.

Figure 4:
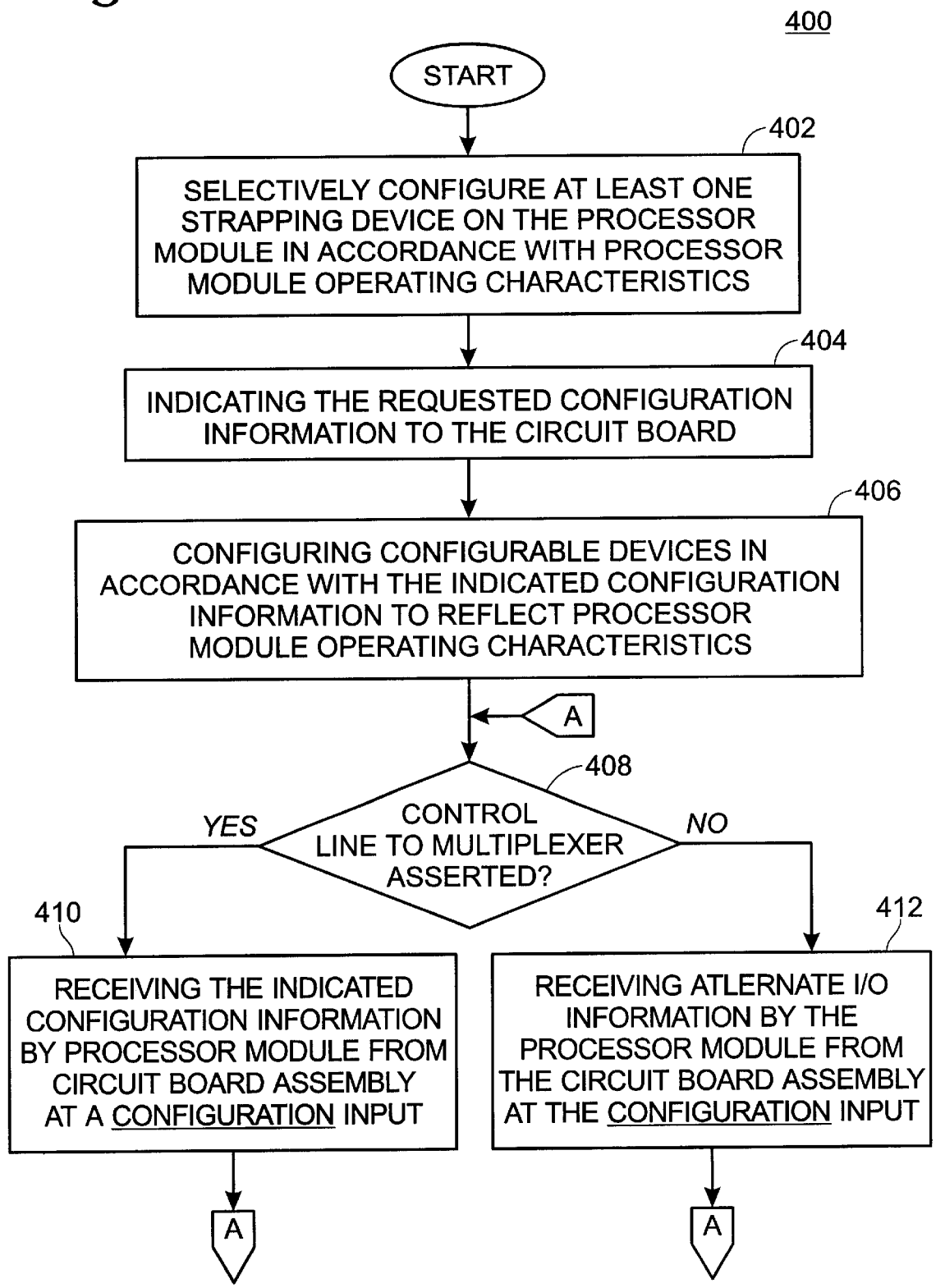
FIG. 4 is a flow chart illustrating a method for automatically configuring strapping options on a circuit board assembly, in accordance with the teachings of the present invention.

Turning now to FIG. 4, a flow chart illustrating a method for automatically configuring strapping options on a circuit board assembly (e.g., circuit board assembly 140), is shown. In particular, method 400 depicted in FIG. 4 begins with, in step 402, selectively configuring at least one strapping device (i.e., strapping device 230 or 330) on processor module 102 to indicate configuration information corresponding to certain operating characteristics of processor module 102. In step 404, processor module 102, selectively configured to indicate configuration information in step 402, provides the indicated configuration information to circuit board assembly 140. In step 406, configurable devices such as, clock source 126, are configured in accordance with the configuration information indicated by processor module 102. Having configured configurable devices in step 406, a determination is made as to whether mux_line 220 is asserted, which controls multiplexer 124 to accept input from either processor module 102 or data lines 222–226.

If, in step 408, it is determined that mux_line 220 is asserted (i.e., logic "1"), multiplexer 124 is set, in step 410 to accept input from processor module 102 via configuration output 125. In step 412, indicated configuration information received from processor module 102 is accepted by multiplexer 124 and routed to signal bus 128 of processor module 102. In accordance with the illustration of FIGS. 2 and 3, mux_line 220 is asserted during power-up and reset states. Thus, during such power-up and reset states, processor module 102 may automatically configure itself, via multiplexer 124 of circuit board assembly 140 when mux_line 220 is asserted. Having provided configuration information to said configurable device (e.g., processor module 102) in step 412, the method routes back to step 408 for further determination of whether mux_control line 220 is asserted.

If, however, in step 408, mux_control line 220 is not asserted (i.e., logic "0"), multiplexer 124 is set, in step 414 to accept operational data from data lines 222–226. In step 416, the operational data received in step 414 is routed to processor module 102 via signal bus 128. As illustrated with respect to FIGS. 2 and 3, processor module 102 will continue to receive operational data from multiplexer 124 during normal operational states. Accordingly, the method routes back to step 408 to determine whether the state of mux_control line 220 has changed.

Thus, alternative embodiments for a method and apparatus for the automatic configuration of a circuit board assembly have been described. While the method and apparatus of the present invention has been described in terms of the above illustrated embodiments, those skilled in the art will recognize that the invention is not limited to the embodiments described. For example, although FIGS. 1, 2 and 3 depict processor module 102 configuring clock source 126 and the bus/core ratio for processor module 102, those skilled in the art will appreciate that this is by example only, and that processor module 102 may be used to configure a broad range of configurable devices. Accordingly, processor module 102 may be beneficially incorporated into a broad range of devices which would benefit from the quality and efficiency features associated with the teachings of the present invention. Thus, the present invention can be practiced with modification and alteration within the spirit and scope of the appended claims. Accordingly, the descriptions thereof are to be regarded as illustrative instead of restrictive on the present invention.

What is claimed is:

1. A circuit board assembly comprising:
   an output bus coupled to a receptacle, the receptacle for a processor module, the output bus for receipt of configuration information represented by at least one electronic component selected front the group consisting of a selectively placed resistor and a selectively blown fuse; and
   an input bus coupled to the receptacle, the input bus to receive the configuration information from the output bus at a first time, and to receive operational data at a second time.

2. The circuit board assembly of claim 1 wherein the configuration information indicates system bus frequency.

3. The circuit board assembly of claim 1 wherein the configuration information indicates bus/core ratio configuration.

4. The circuit board assembly of claim 1 further comprising a receptacle for a clock device.

5. The circuit board assembly of claim 1 wherein the first time includes a reset condition.

6. The circuit board assembly of claim 1 wherein the first time includes a power-up condition.

7. The circuit board assembly of claim 1 further comprising a second configurable device.

8. The circuit board assembly of claim 7 wherein the second configurable device is configured by at least a subset of the configuration information.

9. The circuit board assembly of claim 7 wherein the second configurable device is a clock source.

10. The circuit board assembly of claim 1 further comprising a multiplexer wherein the configuration information is a first input to the multiplexer and the operational data is a second input to the multiplexer, the output of the multiplexer being coupled to the input bus.

11. The circuit board assembly of claim 10 further comprising a Host/PCI bus bridge wherein the bus bridge provides multiplexer control signal to the multiplexer.

12. An apparatus comprising:
   an output bus coupled to a receptacle, the receptacle for a processor module, the output bus for receipt of configuration information represented by at least one electronic component selected from the group consisting of a selectively placed resistor and a selectively brown fuse; and
   an input bus coupled to the receptacle, the input bus to receive the configuration information from the output bus at a first time, and to receive operational data at a second time.

13. The apparatus of claim 12 wherein the configuration information indicates system bus frequency or bus/core ratio configuration.

14. The apparatus of claim 12 wherein the first time includes a reset condition or a power-up condition.

15. The apparatus of claim 12 further comprising a second configurable device.

16. The apparatus of claim 15 wherein the second configurable device is a clock source.

17. A circuit board assembly comprising:
   a plurality of strapping devices to indicate configuration information represented by at least one electronic component selected from the group consisting of a selectively placed resistor and a selectively blown fuse;
   an output bus coupled to a receptacle, the receptacle for a processor module, the output bus for receipt of the configuration information provided by the plurality of strapping devices; and an input bus coupled to the receptacle, the input bus to receive the configuration information provided by the plurality of strapping devices from the output bus at a first time, and to receive operational data from the output bus at a second time.

18. The apparatus of claim 12 wherein the configuration information indicates system bus frequency or bus/core ratio configuration.

19. The apparatus of claim 12 wherein the first time includes a reset condition or a power-up condition.

20. The apparatus of claim 12 further comprising a second configurable device.

21. The apparatus of claim 19 wherein the second configurable device is a clock source.

* * * * *